(12) United States Patent
Samin

(10) Patent No.: US 9,436,949 B1
(45) Date of Patent: Sep. 6, 2016

(54) EVALUATING GEOGRAPHICALLY GROUPED DATA SETS

(71) Applicant: AGC Acquisitions LLC, Las Vegas, NV (US)

(72) Inventor: Gian Samin, Las Vegas, NV (US)

(73) Assignee: Gian Samin, Henderson, NV (US)

( * ) Notice: Subject to any disclaimer, the term of this patent is extended or adjusted under 35 U.S.C. 154(b) by 0 days.

(21) Appl. No.: 14/582,847

(22) Filed: Dec. 24, 2014

Related U.S. Application Data

(60) Provisional application No. 61/921,384, filed on Dec. 27, 2013, provisional application No. 62/029,926, filed on Jul. 28, 2014.

(51) Int. Cl.
*G06Q 40/00* (2012.01)
*G06Q 30/02* (2012.01)

(52) U.S. Cl.
CPC ................. *G06Q 30/0205* (2013.01)

(58) Field of Classification Search
CPC ...... G06Q 10/00; G06Q 20/00; G06Q 30/00; G06Q 40/00
USPC ........................................................ 705/3–44
See application file for complete search history.

(56) References Cited

U.S. PATENT DOCUMENTS

| | | | | |
|---|---|---|---|---|
| 6,061,661 | A * | 5/2000 | Hagan ................... | G06Q 40/00 705/36 R |
| 7,516,680 | B2 * | 4/2009 | Clingman et al. ................. | 74/44 |
| 7,822,680 | B1 * | 10/2010 | Weber et al. .................... | 705/38 |
| 8,015,091 | B1 * | 9/2011 | Ellis ....................... | G06Q 40/00 705/35 |
| 2002/0161621 | A1 * | 10/2002 | Anthony ......................... | 705/10 |
| 2005/0149425 | A1 * | 7/2005 | Hagan .................... | G06Q 40/00 705/36 R |
| 2008/0183617 | A1 * | 7/2008 | Schneider ....................... | 705/39 |
| 2010/0076908 | A1 * | 3/2010 | Frank .................... | G06Q 40/04 705/36 T |
| 2011/0191261 | A1 * | 8/2011 | Tanner ................... | G06Q 30/02 705/36 R |
| 2013/0339219 | A1 * | 12/2013 | Bernheimer ........... | G06Q 40/02 705/38 |

OTHER PUBLICATIONS

CoreLogic Expands Single-Family Rental Solutions Suite for Investors and Lenders, Dec. 4, 2013, printed from http://www.corelogic.com/about-us/news/corelogic-expands-single-family-rental-solutions-suite-for-investors-and-lenders.aspx on Oct. 29, 2015.
Karen Weise, et al., BloombergBusiness, "Wally Charnoff's RentRange, the Data King of Rental Housing—BusinessWeek," pp. 1-9, printed from http://www.bloomberg.com/bw/articles/2013-05-02/wally-charnoffs-rentrange-the-data-k . . . on Oct. 29, 2015.
Riley McDermid, "Zillow's Rent Zestimates to Provide Rent Prices for 90 Million Homes," pp. 1-5, printed from http://www.Zillow's Rent Zestimates to Provide Rent Prices for 90 Million Homes / VentureBeat/Mobi . . . on Oct. 29, 2015.

* cited by examiner

*Primary Examiner* — Frantzy Poinvil
(74) *Attorney, Agent, or Firm* — Procopio Cory Hargreaves and Savitch LLP; Pattric J. Ralins

(57) ABSTRACT

Geographically grouped data sets may be evaluated in order to determine an ROI for different assets. The ROI of an asset may be determined based on one or more accounting items, or on an expense percentage for the asset. The value for each accounting item and the value for the expense percentage may vary depending on the geographic location of the asset. The geographically grouped data sets may be received from a variety of sources, including proprietary databases, user inputs, and third party resources. Results from evaluating the geographically grouped data sets may be used to supplement and/or refine the existing data stored in the proprietary database. A subset of the available data may be used to generate an initial ROI for one or more assets. Initial ROIs may be used to filter and identify assets for more in depth, refined, or resource-intensive analysis.

19 Claims, 13 Drawing Sheets

| | Formulas – REO/ Short Sale/Traditional Sale Properties | 400 |
|---|---|---|
| Purchase Price | Researched Data_Manual Entry | |
| Estimated Repairs | Researched Data_Manual Entry | |
| Estimated Utilities | Sq. ft. x 0.166 | |
| Estimated Cash For Keys | $0.00 | |
| Estimated Liens | $0.00 | |
| Acquisition Cost | $0.00 | Adjustable in Future |
| Escrow Fees_Title Insurance | Purchase price x 0.01 | |
| Total Acquisition Costs | Purchase Price + Estimated Repairs + Estimated Cash For Keys + Estimated Utilities + Estimated Liens + Escrow Fees/Title Insurance + Annual Sid Lid + Annual Pool Maintenance | |
| Annual Rent | Monthly Rent x 11 | |
| Monthly Rent | Researched Data_Manual Entry | |
| Management Fees | Annual Rent *0.08 + $275.00 | Adjustable in Future |
| Annual HOA | Researched Data_Manual Entry | |
| Annual SID_LID | Researched Data_Manual Entry | |
| Annual Tax | Researched Data_Manual Entry | |
| Annual Insurance | $900.00 | Adjustable in Future |
| Annual Pool Maintenance | $1,200.00 (if applicable) | Adjustable in Future |
| 5% Reserve_Replacement | Annual Rent x 0.05 | Adjustable in Future |
| Estimated Net | Annual Rent - Management Fees - Annual HOA - Annual Tax - Annual Insurance - 5% Reserve/Replacement | |
| Estimated Annual Rate of Return | Estimated Net Rental Income / Total Acquisitions Costs | |

Labels: 408, 410, 412, 414, 416, 418, 406, 424, 426, 428, 420, 430, 432, 422, 434, 404, 402

EVALUATING GEOGRAPHICALLY GROUPED DATA SETS

RELATED APPLICATIONS

The present application claims priority to U.S. Provisional Patent Application No. 61/921,384 filed Dec. 27, 2013, and U.S. Provisional Patent Application No. 62/029,926 filed Jul. 28, 2014, each of which is incorporated by reference herein in its entirety.

BACKGROUND

1. Field

The present disclosure generally relates to the field of data analytics. More specifically, the present invention relates to the analysis of geographically grouped sets.

2. Related Art

Investments offer the potential for both immediate and long term profits. One common strategy to profit from investments is through income generated by an asset. Many investors also expect to profit from appreciation in the value of the asset. Nevertheless, investments in assets are fraught with risks. For instance, real estate tends to be far more illiquid asset than stocks, bonds, and certificates of deposits (CDs), and may also be more costly to manage on an ongoing basis.

The rate of return on investment (ROI) is a key metric that may be used to evaluate and compare assets under consideration for investment. In general, ROI measures the gains from an investment relative to the concomitant costs (e.g., acquisition, maintenance, management), and may reflect on the profitability or efficiency of the investment. On the one hand, a prudent investor may rely on ROI to select between different assets for investment. For example, an investor may decide to purchase real estate rather than Treasury bonds if the real estate investment provides a higher ROI. Moreover, ROI may be used to choose between specific assets. For example, a condominium may have a higher ROI than a nearby townhome and therefore be a more attractive real estate investment property.

Determining an ROI for an asset is very challenging. A considerable number of factors that vary geographically may need to be determined or estimated and analyzed. However, reliable geographically specific data tend to be unavailable. Compounding this difficulty is that factors that are applicable to one asset in a particular geographic area may be different or altogether irrelevant for another asset in the same geographic area. Therefore, what is needed is a system and method that overcomes these significant problems as described above.

SUMMARY

According to various embodiments, there is provided a system and a method for analyzing and evaluating assets based on geographically grouped data sets. In one exemplary embodiment, calculations may be made to determine an estimated ROI for one or more assets based on the income and expenses associated with each asset. The income and expenses for different assets may vary depending on the geographic location of the asset. The ROIs for different assets may form the basis for meaningful and actionable comparisons between multiple assets.

In various embodiments, geographically grouped data sets may be received from or provided by variety of data sources, including, for example, but not limited to, a proprietary database, user inputs, and third party resources. In various embodiments, some or all of the user inputs and/or data from third party resources may be analyzed such as by applying one or more statistical analysis techniques. For example, user inputs and/or data from third party resources may be segmented, grouped, or tagged geographically. At least some of the results of the analysis may be used to supplement and/or refine the existing data stored in the proprietary database.

In some embodiments, a subset of the available data (e.g., data from third party resources) may be used to generate an initial ROI for an asset. Advantageously, the calculation of an initial ROI may require less computational resources (e.g., data, time) than the calculation of an estimated ROI. Thus, initial ROIs may be used to quickly filter a large number of assets and identify those that merit more in depth, refined, or resource-intensive analysis. For example, an estimated ROI may be calculated in the event that the initial ROI for an asset exceeds a certain predetermined threshold.

Some or all of the aspects of various the transactions that may be applicable to a specific type or category of assets (e.g., purchase, sale, trade, and rental) are considered on an asset-to-asset basis in order to account for all individually variable income and expense items. In addition, ROIs may be calculated based on current information, which may be acquired and/or updated on a continuous, dynamic, and/or on demand basis. Advantageously, using current information that is acquired and/or updated on demand, continuously, and/or dynamically yields a highly accurate estimated ROI for an asset.

In various embodiments, the estimated ROIs for different assets may be compared to generate an ordered or ranked list of potential assets. For example, different assets may be ordered or ranked based on their respective estimated ROI. A graphical user interface (GUI) may be provided in some embodiments to allow users to set up customized searches and comparisons. For example, a user may identify, filter, and/or sort potential assets for investment based on location (e.g., Las Vegas, Nev.) and/or the estimated ROI (e.g., greater than 3%). The user may create a customized search and comparison by entering specific parameters and/or selecting one or more pre-configured options.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 4 is a table illustrating a formula for estimating an ROI for an asset according to various embodiments;

FIG. 5D illustrates a GUI of an asset analysis and evaluation portal according to various embodiments;

DETAILED DESCRIPTION

Figure 1:
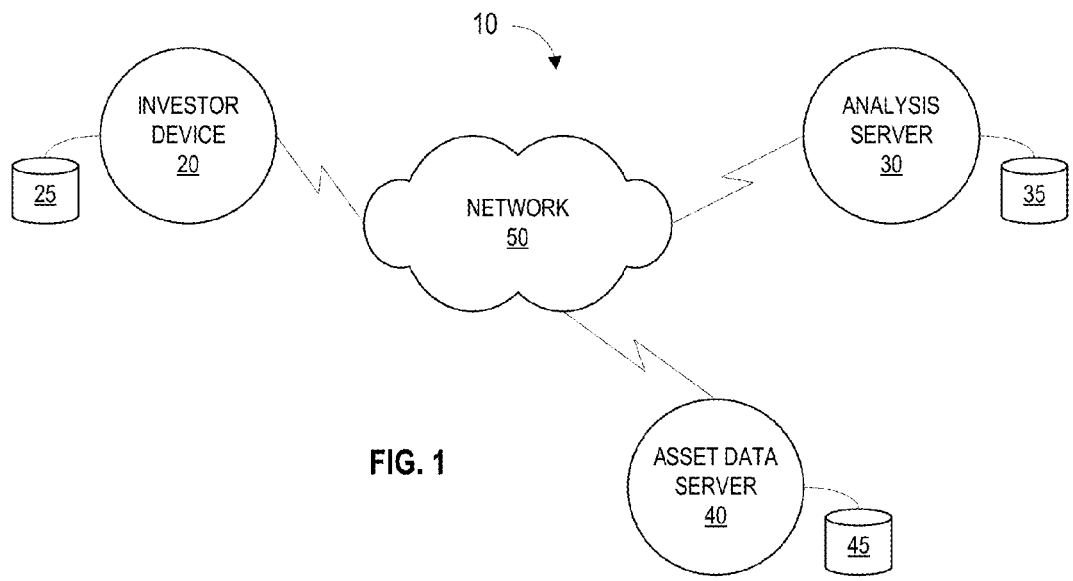
FIG. 1 is a network diagram illustrating a system for analyzing and evaluating assets according to various embodiments.

Various embodiments of the systems and methods disclosed herein provide for evaluating geographically grouped data sets. In various embodiments, geographically grouped data sets received from a variety of data sources may be evaluated to determine an estimated ROI for one or more assets. The systems and methods disclosed herein also provide for determining an initial ROI for an asset using a subset of the available data. Furthermore, the systems and methods disclosed herein provide for displaying customized and interactive comparisons of multiple assets for evaluation by an investor.

The systems and methods disclosed herein may provide investors with information about an asset along with an estimated ROI for the asset. The estimated ROI for the asset may be determined based on a comprehensive assortment of geographically specific data. For example, the ROI for an asset may be determined based on a list of accounting items for the asset that may be specific to the geographic location of the asset. The list of accounting items for an asset may include income and expense items. Furthermore, the accounting items may include at least some actual or precisely estimated values that are specific to an individual asset. Alternately or in addition, the systems and methods disclosed herein may provide investors with an initial ROI for an asset. The initial ROI for an asset may be determined based an expense percentage, more generalized or standard values for certain accounting items, and/or a subset of the comprehensive list of accounting items for the asset.

Other asset specific variables may be used in alternative embodiments. For example, in one embodiment the asset is a professional athlete such as a baseball player and the investor is the team owner or management. The professional baseball player has corresponding variables that are geographically specific such as batting average in a specific stadium or batting average at sea level. In an alternative embodiment, the asset may be a business such as an educational service franchise and the investor is a potential purchaser of the franchise. The franchise has corresponding variables that are geographically specific such as average income of the families in the region, average education of the parents in the region and the number of students in the region that attend private school or go to college after high school. These alternative embodiments are contemplated to be covered by the scope of the present disclosure. However, the primary embodiment described herein is an embodiment where the asset is a real estate property with corresponding geographically specific variables.

The generalized or standard values for different assets may vary geographically. Thus, the systems and methods disclosed herein may provide a different standard value for the accounting items of assets located in different geographic areas. Furthermore, the precision of the standard values applied for an asset may depend on the specificity of the geographic location of the asset. For example, according to various embodiments of the systems and methods disclosed herein, a standard value that is generalized over an entire state may be applied for an asset specified to be in that state. On the other hand, a more precise standard value for a metro area or city or zip code or block may also be applied if the asset is specified to be in one of those more specific areas.

The systems and methods disclosed herein may perform customized searches for assets based on any number and/or combinations of variables (also referred to herein as parameters), including the estimated ROI and the location of individual assets. For example, in one embodiment, each asset in an area (e.g., zip code, neighborhood, map zone) selected by an investor may be compared based on the respective ROIs.

As will be described in further detail herein, different types of geographically grouped data sets from a variety of sources may be evaluated to determine the ROI (initial or estimated) of an asset. For example, the geographically grouped data sets may include various accounting items, such as income and expense items relating to the purchase, sale, maintenance, rental, and/or lease of different assets. In addition, the system may also receive information that estimates or may be used to estimate the potential income from each asset, including, for example, but not limited to, rental income and appreciation in asset value.

Numerous formulas may be used to determine the potential income and expenses as well as the overall ROI for an asset. In some embodiments, the systems and methods disclosed herein may provide an investor with an estimate of the overall expenses (e.g., an expense percentage). For example, the overall cost of ownership for one asset (e.g., a condominium in Las Vegas, Nev.) may be 40%. Alternately, in some embodiments, an investor may access detailed income and expense information for an asset, and enter customized values for at least some of the individual accounting items (e.g., rental value, mortgage, taxes, etc.). In some embodiments, the investor may provide override values that replace any existing standard or estimated values. An interactive user interface is provided for potential investors to research available assets for investment and then compare different assets that meet certain user-selected criteria.

Investors are provided with an accurate estimated ROI for an asset and the ability to compare the ROI with those of other assets. This information may be used to provide suggestions that may facilitate and optimize the selection of real estate investments.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

FIG. 1 is a network diagram illustrating a system 10 for analyzing and evaluating assets according to various embodiments. Referring to FIG. 1, an investor may access the system 10 from an investor device 20. The investor device 20 may be any wired or wireless device, including, for example, but not limited to a workstation or desktop computer, a tablet PC, or a smartphone. In various embodiments, the investor device 20 may be connected with a database 25 for local storage. For example, a software application (e.g., web browser) that provides access to various features of an analysis server 30 as well as user data may be stored in the database 25.

As shown in FIG. 1, the investor device 20 may communicate with the analysis server 30 via a network 50. The network 50 may be a wired and/or wireless network. In various embodiments, the investor device 20 may communicate with the analysis server 30 in order to research, analyze, and identify various assets for investment. For instance, the investor device 20 may be configured to transmit various customized and/or preconfigured inquiries to the analysis server 30.

Meanwhile, the analysis server 30 may process inquiries from the investor device 20 and provide the results to the investor device 20 via the network 50. The analysis server 30 may receive data on various assets and perform different calculations to determine an ROI for individual assets. The analysis server 30 may communicate with a first database 35, which stores, for example, but not limited to, asset data, results of calculations, investor profiles, user interfaces, and computer-executable programs that may run on the analysis server 30.

In various embodiments, the analysis server 30 may communicate with an asset data server 40 in order to access at least some of the data stored by the asset data server 40 in a second database 45. For example, the second database 45 may contain the estimated, projected, historical, and/or actual sale prices of different assets. The analysis server 30 may obtain at least a portion of the data used to calculate the expense percentage, income and expenses items, and/or the ROI of an asset from the asset data server 40. In some embodiments, the asset data server 40 may be hosted by one or more data collection services including, for example, but not limited to the Multiple Listing Service (MLS), Craigslist, or Zillow®. For clarity and convenience, the analysis server 30 is shown in FIG. 1 to communicate with a single asset data server 40. However, a person having ordinary skill in the art can appreciate that the analysis server may communicate and obtain data from any appropriate, required, or desired number of asset data servers in addition to or instead of the asset data server 40 without departing from the scope of the present invention.

Figure 2:
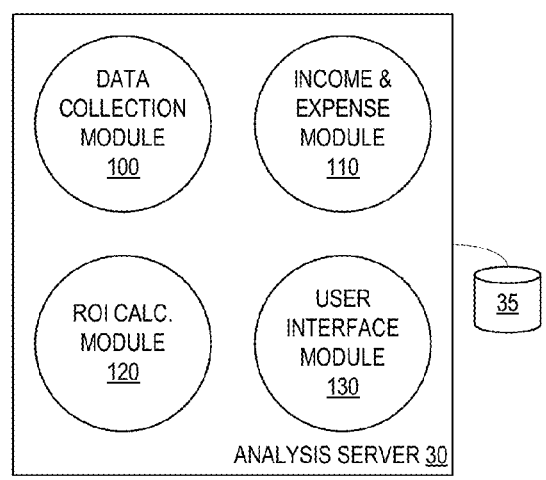
FIG. 2 is a block diagram illustrating an asset analysis server according to various embodiments.

FIG. 2 is a block diagram illustrating the analysis server 30 according to various embodiments. As shown in FIG. 2, the analysis server 30 may include a data collection module 100. In various embodiments, the data collection module 100 may be configured to obtain data from the one or more sources, including, for example, but not limited to, the investor device 20, the first database 35, and the asset data server 40. At least some of the asset data obtained from sources such as the asset data server 40 may be stored in the first database 35. Alternately or in addition, some or all of the data may be used in real time for analysis, evaluation, and presentation on the investor device 20.

In various embodiments, the analysis server 30 may also include an income and expense module 110. The income and expense module 110 may be configured to process the asset data obtained by the data collection module 100. The income and expense module 110 may process asset data in order to determine the accounting items for individual and/or groups of assets. In various embodiments, the income and expense module 110 may process the asset data to determine the accounting items that may be applicable to assets in a particular geographic region. For example, the income and expense module 110 may apply various statistical analysis techniques to at least some of the data obtained by the data collection module 100 and compute, for example, the HOA fees for an asset in a particular city (e.g., 2600 W. Harmon Avenue #28034, Las Vegas, Nev. 89158). Alternately or in addition, the income and expense module 110 may determine the average HOA fees for similar types of assets in that same city (e.g., condominiums in Las Vegas, Nev.).

The income and expense module 110 may also use at least some of the data obtained by the data collection module 100 to determine an overall expense percentage for various assets. For example, the income and expense module 110 may determine that the average expense percentage for a certain type of asset in a particular geographic region (e.g., condominiums in Las Vegas, Nev.) is 50%. At least some of the values for the accounting items and/or expense percentages determined for different assets may be stored in the first database 35.

As shown in FIG. 2, the analysis server 30 may further include a return on investment (ROI) calculation module 120. The ROI calculation module may be configured to calculate the ROI for different assets using the accounting items and/or expense percentages determined by the income and expense module 110. In some embodiments, the ROI calculation module 120 may determine an estimated ROI for an asset. Alternately or in addition, the ROI calculation module 120 may calculate an initial ROI for an asset. For example, the ROI calculation module 120 may calculate the estimated ROI for an asset based on a comprehensive list of accounting items for the asset. Meanwhile, the ROI calculation module 120 may calculate an initial ROI for the asset using at least some standard values and/or an expense percentage for similar assets located in the same geographic region. At least some of the ROIs calculated for different assets may be stored in the first database 35.

Finally, a user interface module 130 may be provided to organize all of the received data and calculated data into various graphical user interfaces (GUIs) for display to an investor on the investor device 20.

Figure 3:
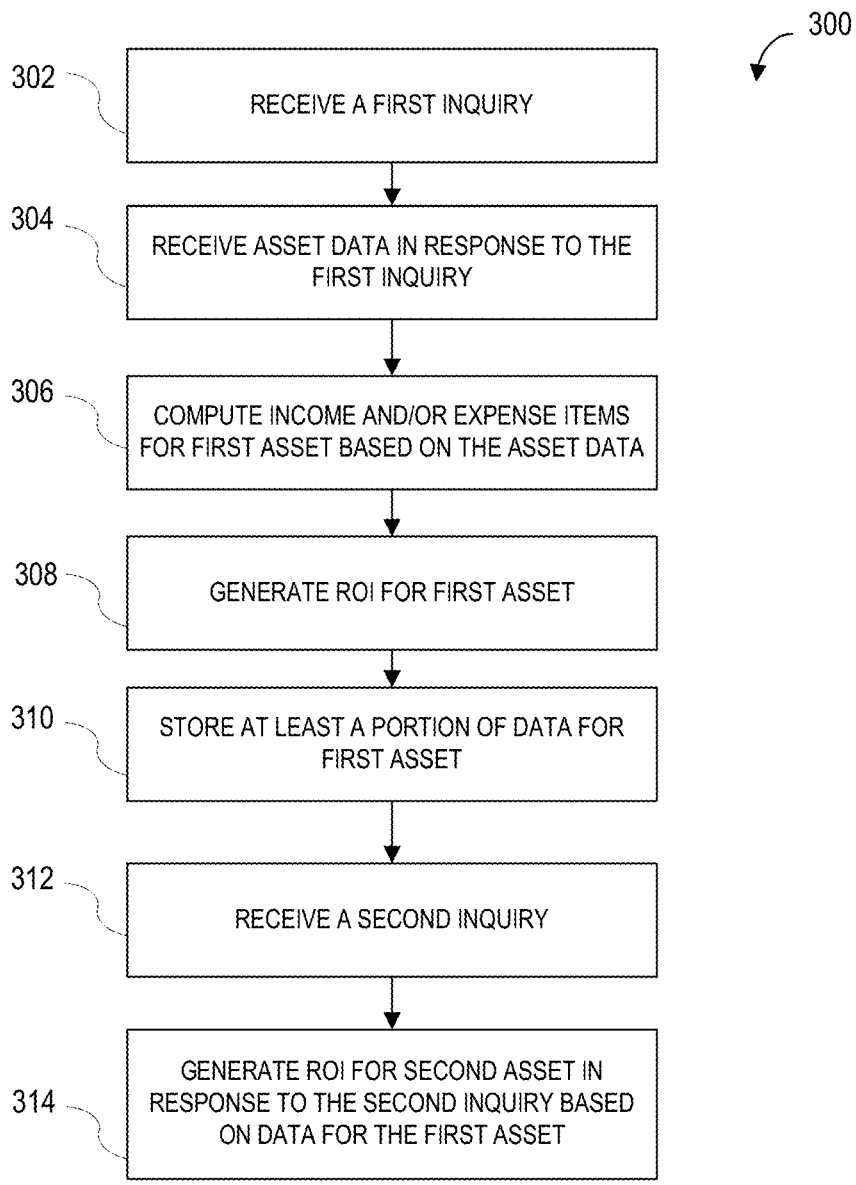
FIG. 3 is a flow diagram illustrating a process for analyzing and evaluating assets according to various embodiments.

FIG. 3 is a flowchart illustrating a process 300 for analyzing and evaluating investment properties according to various embodiments. Referring to FIG. 3, the process 300 may be performed by the analysis server 30 described with respect to FIGS. 1 and 2.

At 302, the analysis server 30 may receive a first inquiry. For example, the analysis server 30 may receive, from the investor device 20, a first inquiry to calculate the ROI of a first asset. Alternately, an investor may input a first inquiry for assets having certain characteristics and/or meeting one or more criteria. The analysis server 30 may identify at least a first asset based on the first inquiry. In some embodiments, the first inquiry may pertain to a first asset that is a real estate investment property.

At 304, in response to the first inquiry, the analysis server 30 may receive data. In various embodiments, the analysis server 30 may be configured to receive data from a variety of sources including, for example, but not limited to, the investor device 20, the first database 35, and the asset data server 40. For example, when the first inquiry pertains to a real estate investment property, the analysis server 30 may receive at least a portion of the data from an asset data server that is affiliated with or operated by one or more real estate data collection services (e.g., MLS, Craigslist, and Zillow®).

The analysis server 30 may also receive some data from inputs made by an investor through the investor device 20. For example, in some embodiments, an investor may input values for certain expense or income items of the first asset (e.g., mortgage, utilities) based on personal knowledge.

Furthermore, the analysis server 30 may be configured to receive any number and/or types of asset data. For example, the analysis server 30 may receive data for the real estate investment property that includes, for example, but not limited to, address, neighborhood, zip code, HOA, year built, square footage, number of bedrooms and bathrooms, rental price, sale price, lease date and lease price (of a current lease), number of days on the market, taxes, liens, previous sale price, previous rent price, estimate sale value, and estimate monthly rent value. In various embodiments, the analysis server 30 may additionally receive various types of data for assets that are similar or comparable to the first asset.

At 306, the analysis server 30 may compute income and/or expense items for the first asset based on the data received at 304. For instance, the accounting items for a real estate investment property may include, for example, but not limited to, repair costs, cash for keys, utilities, liens, homeowners' association assessments, taxes, and rental income. In an alternative embodiment, income may include production, such as the production of a professional athlete. In various embodiments, the analysis server 30 may analyze the data received at 304 to compute the accounting items for the first asset. For example, the accounting items for the first asset may be computed using the data that is specific to the first asset and/or data for similar and/or comparable assets. In various embodiments, the accounting items for the first asset may be specific to the geographic location of the first asset.

At 308, the analysis server 30 may generate an ROI for the first asset. For example, the ROI for the first asset may be determined based on the accounting items for the first asset. At 310, the analysis server 30 may store at least a portion of the data for the first asset. In various embodiments, the analysis server 30 may store data for the first asset in the first database 35. For example, the analysis server 30 may be configured to store one or more of the asset characteristics, income and expenses, and ROI for the first asset.

At 312, the analysis server 30 may receive a second inquiry. The second inquiry may originate from the same or a different investor via the investor device 20 or another device similar to the investor device 20. In various embodiments, the second inquiry may be to determine the ROI for a second asset. Alternately, the second inquiry may be to identify at least a second asset having certain characteristics and/or meeting one or more criteria.

At 314, the analysis server 30 may determine the ROI for a second asset in response to the second inquiry based at least in part on the data for the first asset stored at 310. For example, the first asset and the second asset may be similar and/or comparable real estate investment properties located in the same geographic region. As such, the analysis server 30 may use at least some of the accounting items (e.g., rental value, HOA fees, and utilities) determined for the first asset to estimate the accounting items for the second asset.

FIG. 4 is a table illustrating a formula 400 for estimating an ROI for an asset according to various embodiments. In some embodiments, the analysis server 30 may estimate the ROI for a real estate investment property that is used for rental income. The formula 400 may be applied to determine the ROI for the rental investment property. As shown in FIG. 4, the ROI of a rental investment property (i.e., the estimated annual rate of return 402) may a ratio of an estimated net rental income 404 for the property and a total acquisition cost 406. The total acquisition cost for a property 406 may include the purchase price 408, estimated repairs 410, estimated cash for keys 414, estimated liens 416, and escrow fees and title insurance 418. Meanwhile, the estimated net rental income 404 may be the annual rent 424 subtracted by the estimated utilities 412, annual special improvement district (SID) and local improvement district (LID) 420, annual pool maintenance 422, management fees 426, annual HOA fees 428, annual tax 430, annual insurance 432, and reserve and replacement 434.

The formula 400 illustrated in FIG. 4 are for exemplary purposes only. A person having ordinary skill in the art can appreciate that the analysis server 30 may apply a similar or a different formula in order to estimate the ROI for different rental properties without departing from the scope of the present invention. Furthermore, the analysis server 30 may apply a similar or a different formula to estimate the ROI for other types or categories of assets, which may include additional and/or different accounting items that are not included in the formula 400.

In various embodiments, the analysis server 30 provides a GUI that allows an investor to customize, adjust, or otherwise provide one or more accounting items that may be applicable to various assets. Additionally, certain expense items may be adjustable by an investor via the investor device 20 or automatically by the analysis server 30 to account for annual inflation or market rates. In addition to presenting the ROI to an investor via the investor device 20, the ROI of at least some assets may be stored in the first database 35.

In various embodiments, an investor may interact with the analysis server 30 including by submitting inquiries to the analysis server 30 (e.g., operations 302 and 312 of the process 300 described with respect to FIG. 3). One type of inquiry may include desirable characteristics and/or criteria of assets for potential investment. For example, an investor may submit an inquiry to the analysis server 30 that specifies desired features for real estate investment properties that include, for example, but not limited to, location, size, number of rooms, sale price, and rental value. The analysis server 30 may identify assets having the desirable characteristics and/or matching the criteria specified in the inquiry. The results may be displayed to the investor on the investor device 20 via a GUI.

In various embodiments, the inquiry from the investor may specify a desired value or range for the ROI. The analysis server 30 may calculate an ROI for one or more assets in order to identify assets that have the desired ROI. In one embodiment, the analysis server 30 may first calculate an initial ROI for each of a large number of assets in order to quickly filter and pinpoint assets that have approximately the desired ROI. Once the analysis server 30 filters a large number of assets based on initial ROIs, the analysis server 30 may calculate an estimated ROI for the remaining assets. The estimated ROI may be a more exact value but may require more computational resources (e.g., data, time). Thus, the analysis server 30 may expedite the response to certain inquiries by first calculating initial ROIs for one set of assets then calculating an estimated ROI for each of the remaining subset of assets.

Another type of inquiry may be a request from an investor to calculate an ROI (initial or estimated) for a specific asset.

The analysis server 30 may respond to such inquiries by calculating the ROI based on data received from or provided by a variety of sources. In various embodiments, the analysis server 30 may calculate the ROI for the specific asset based on data for the asset received from the asset data server 40, which may be hosted by one or more data collection services. For example, the analysis server 30 may respond an inquiry to calculate the ROI of a real estate investment property by receiving data from sources that include, for example, but not limited to the Multiple Listing Service (MLS), Craigslist, or Zillow®. In various embodiments, the analysis server 30 may be configured to receive data from the asset data server 40 in real time or on demand.

The analysis server 30 may also use data input by the investor via the investor device 20 in calculating the ROI for a specific asset. For example, the investor may provide values for certain accounting items for a real estate investment property based on personal knowledge. In various embodiments, the analysis server 30 may be configured to store the data input by the investor in the first database 35. Additionally, the analysis server 30 may also use data already stored in the first database 35 to calculate the ROI for the specific asset.

In various embodiments, the analysis server 30 may be configured to update, refine, and/or add data to the first database 35 continuously, on demand, or according to a predetermined schedule (e.g., daily, weekly). For example, the analysis server 30 may receive data on the specific asset from the asset data server 40 and/or an investor via the investor device 20. The analysis server 30 may determine the accounting items associated with the asset, and also compute an ROI for the asset. At least some of the data associated with the asset (e.g., property data, income and expenses, ROI) may be stored in the first database 35 and may be used for in response to future inquiries for similar or comparable assets located in the same geographic region. Thus, to calculate the ROI for a specific asset, the analysis server 30 may use data that have been received and/or calculated for one or more other assets. Moreover, the analysis server 30 may also store and later use the data that is received and/or calculated for a specific asset to respond to queries with respect to one or more other assets.

Figure 5A:
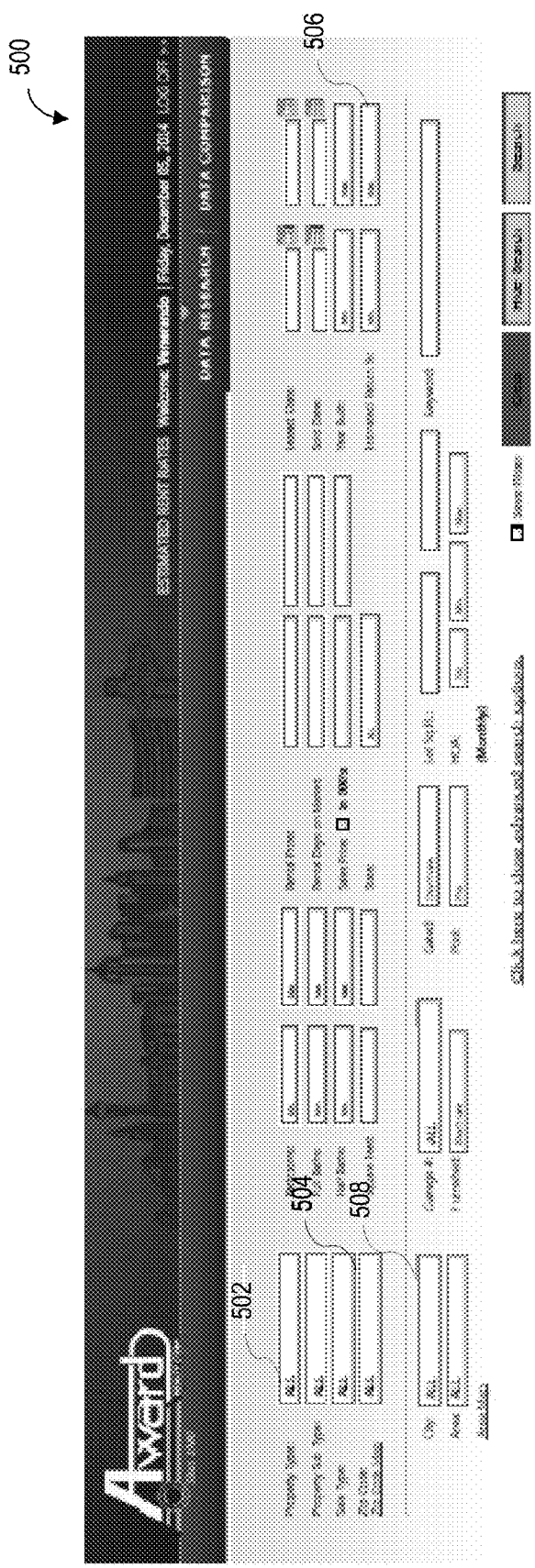
FIG. 5A illustrates a GUI of an asset analysis and evaluation portal according to various embodiments.

FIG. 5A illustrates a GUI of an asset analysis and evaluation portal according to various embodiments. As shown in FIG. 5A, the GUI 500 may display a search screen 500 that provides an investor with various asset characteristics and criteria. The investor may use any one of the asset characteristics and/or criteria shown by the search screen 500 to create an inquiry for the analysis server 30. For example, an investor may create a search request for real estate investment properties based on a property type 502, a zip code 504, and an estimated ROI 506. The investor may further narrow the search based on advanced search options such as a city 508. In various embodiments, the investor may enter the search criteria by entering one or more custom values and/or by selecting from multiple pre-configured options. For example, the investor may enter a specific value for the zip code 504 and choose from several pre-configured values (e.g., condominium, townhome, high rise, single family home) for the property type 502. A person having ordinary skill in the art can appreciate that the search screen 500 may provide any appropriate, required, or desired number of search options without departing from the scope of the present invention.

Figure 5B:
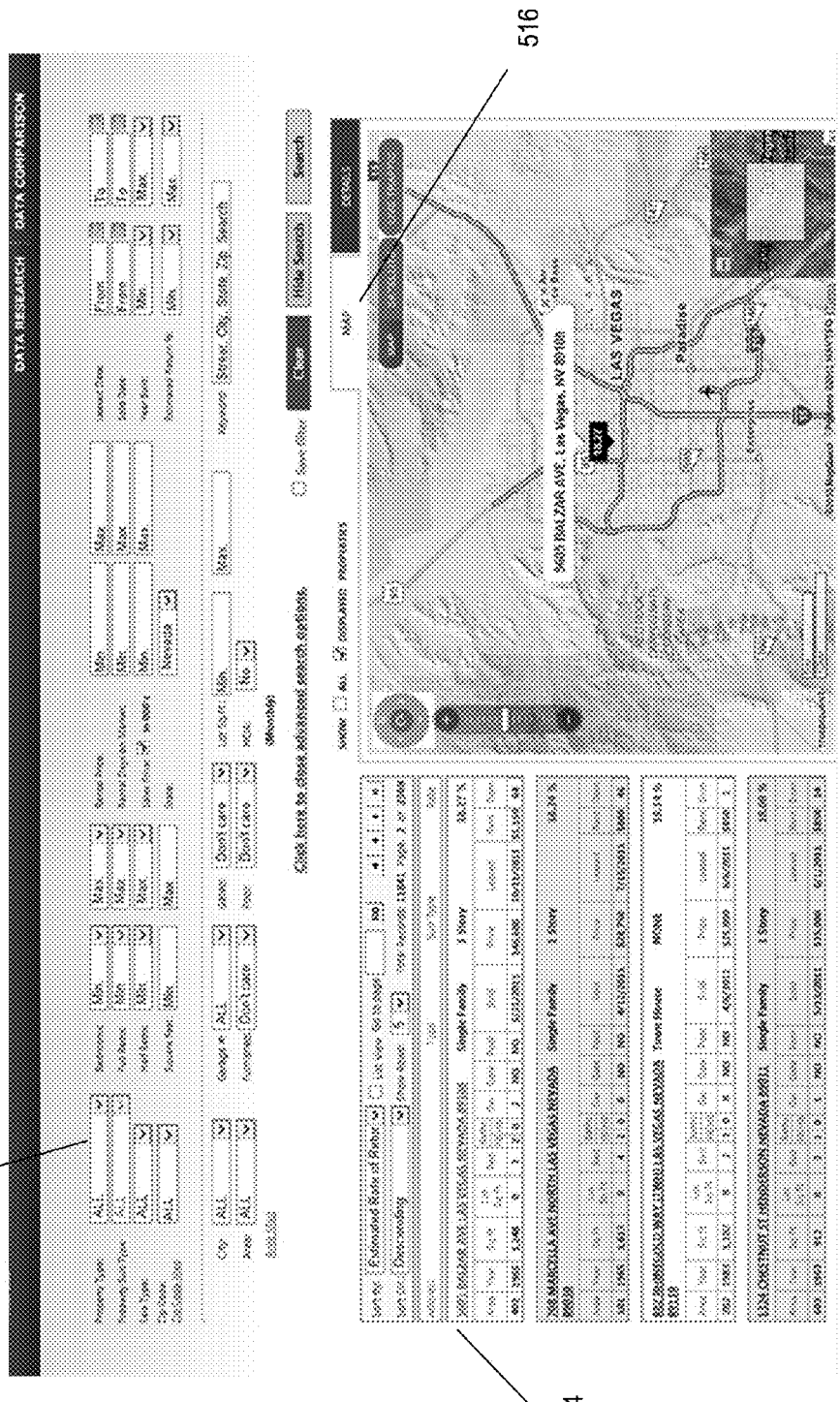
FIG. 5B illustrates a GUI of an asset analysis and evaluation portal according to various embodiments.

FIG. 5B illustrates a GUI of an asset analysis and evaluation portal according to various embodiments. As shown in FIG. 5B, the GUI may display a search screen 510 that allows an investor create an inquiry for the analysis server 30 containing one or more of the search criteria 512, and view an asset list 514 containing the results of the inquiry from the analysis server 30. In addition to the asset list 514, the search screen 510 may include an interactive map 516. In various embodiments, the interactive map 516 displays at least some of the results of the inquiry from the analysis server 30.

Figure 5C:
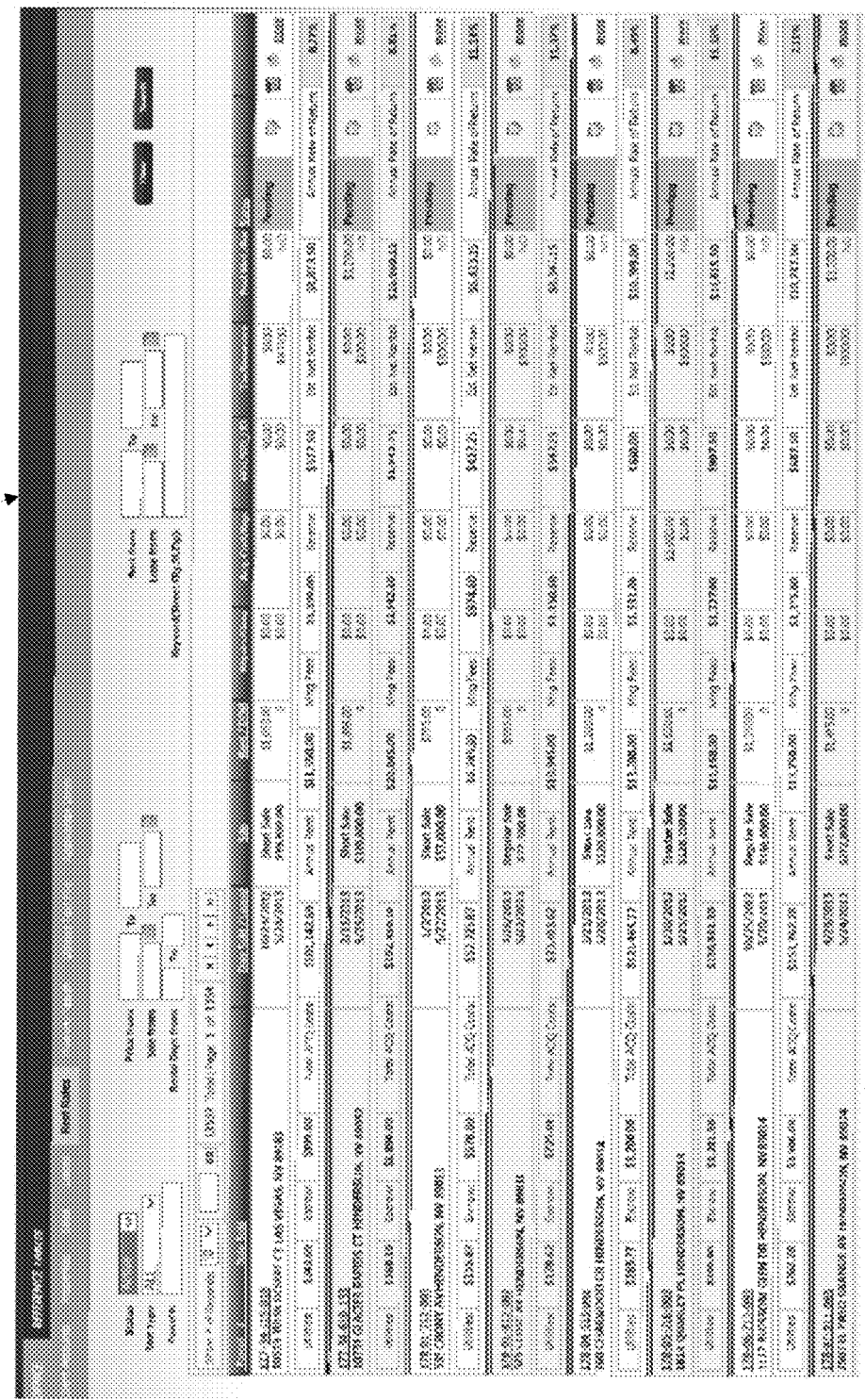
FIG. 5C illustrates a GUI of an asset analysis and evaluation portal according to various embodiments.

FIG. 5C illustrates a GUI of an asset analysis and evaluation portal according to various embodiments. With reference to FIGS. 5A-5C, the GUI may display an asset list 520 cataloging several individual real estate investment properties. In various embodiments, the GUI may display the asset list 520 in response to a search request entered via the search screen 500 described with respect to FIG. 5A or the search screen 510 described with respect to FIG. 5B. The asset list 520 may implement the asset list 514 described with respect to FIG. 5B. In some embodiments, the asset list 520 may show select details for one or more real estate investment properties. For example, an asset 522 is displayed along with at least some of the information about the asset 522, including, for example, but not limited to, the ROI 524.

Figure 5D:
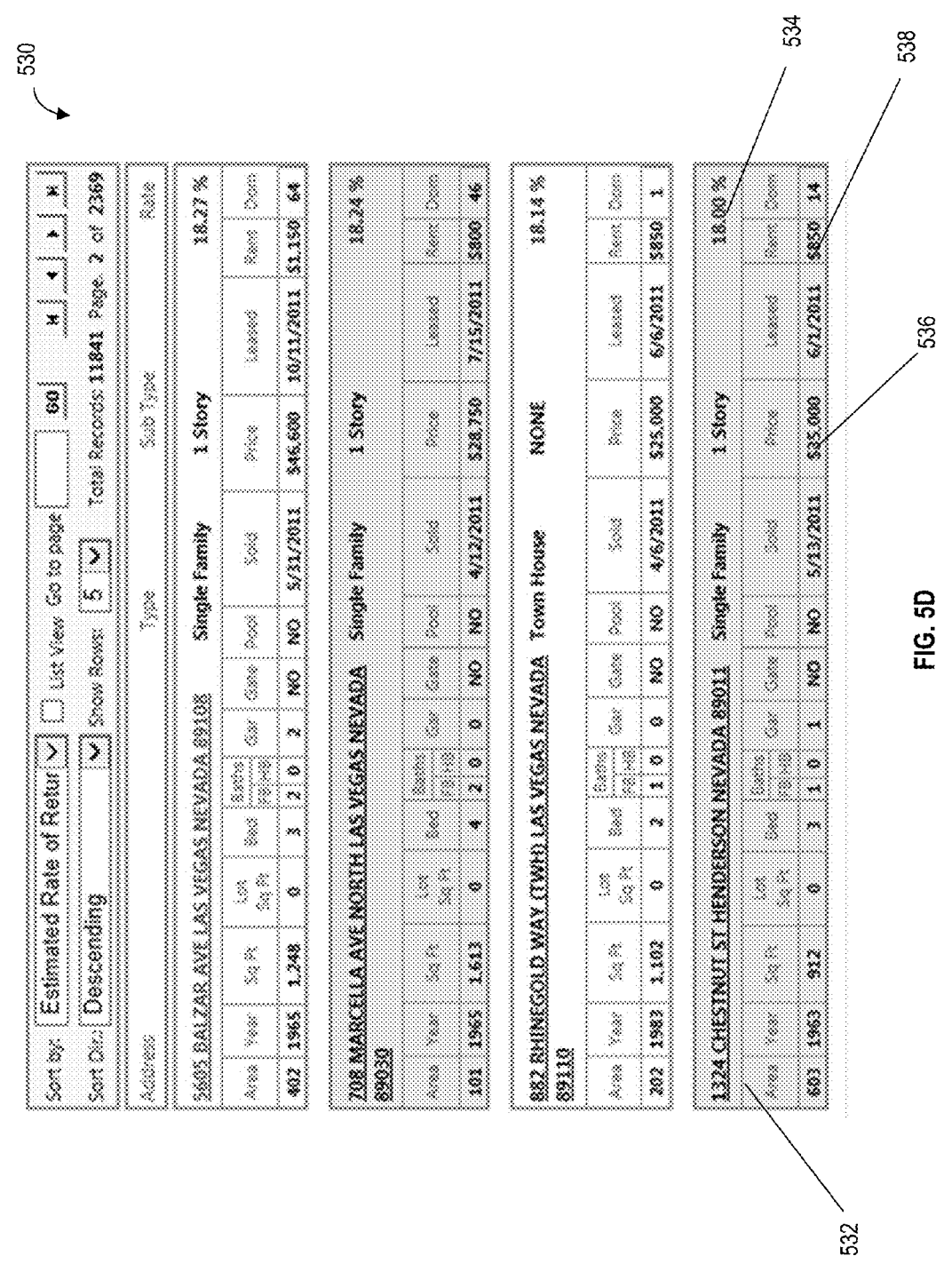

FIG. 5D illustrates a GUI of an asset analysis and evaluation portal according to various embodiments. With references to FIGS. 5A, 5B, and 5D, the GUI may be capable of displaying a more detailed list asset list 530 in response to a search request entered via the search screen 500 described with respect to FIG. 5A or the search screen 510 described with respect to FIG. 5B. The asset list 530 may be used to implement the asset list 514 described with respect to FIG. 5B. In some embodiments, the asset list 530 may show more comprehensive details about individual real estate investment properties. For example, for an asset 532, the asset list 530 shows the ROI 534 as well as additional data on the asset 532 such as a purchase price 536 and a rental value 538. In various embodiments, at least some of the additional data (e.g., the purchase price 536, the rental value 538) may be used to compute the ROI 532.

Figure 6:
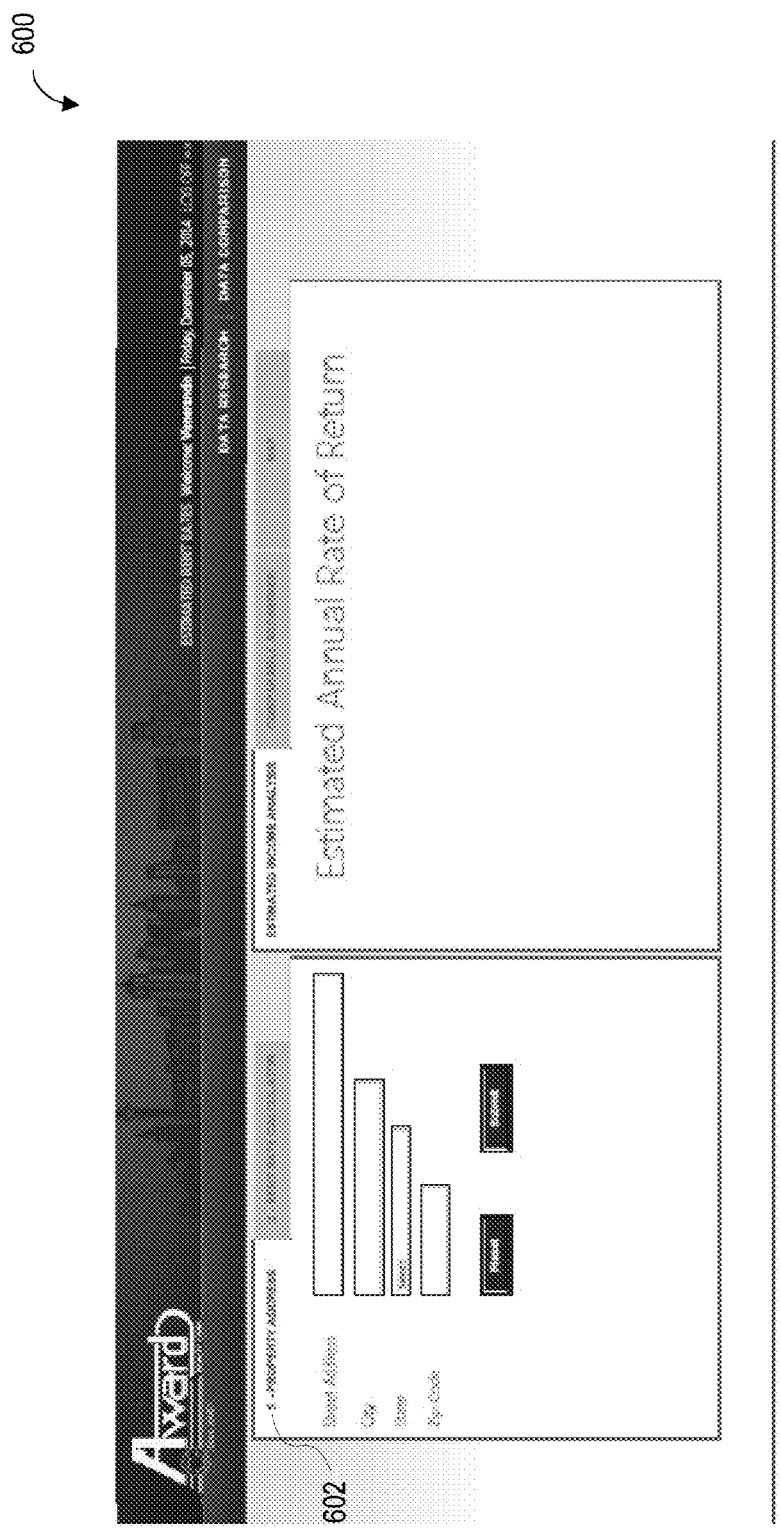
FIG. 6 illustrates a GUI of an asset analysis and evaluation portal according to various embodiments.

FIG. 6 illustrates a GUI of an asset analysis and evaluation portal according to various embodiments. Referring to FIG. 6, the GUI may display a search screen 600 that permits an investor to enter an address 602 (e.g., street address, city, state, and zip code) of a real estate investment property and obtain calculations for an ROI of the property.

Figure 7A:
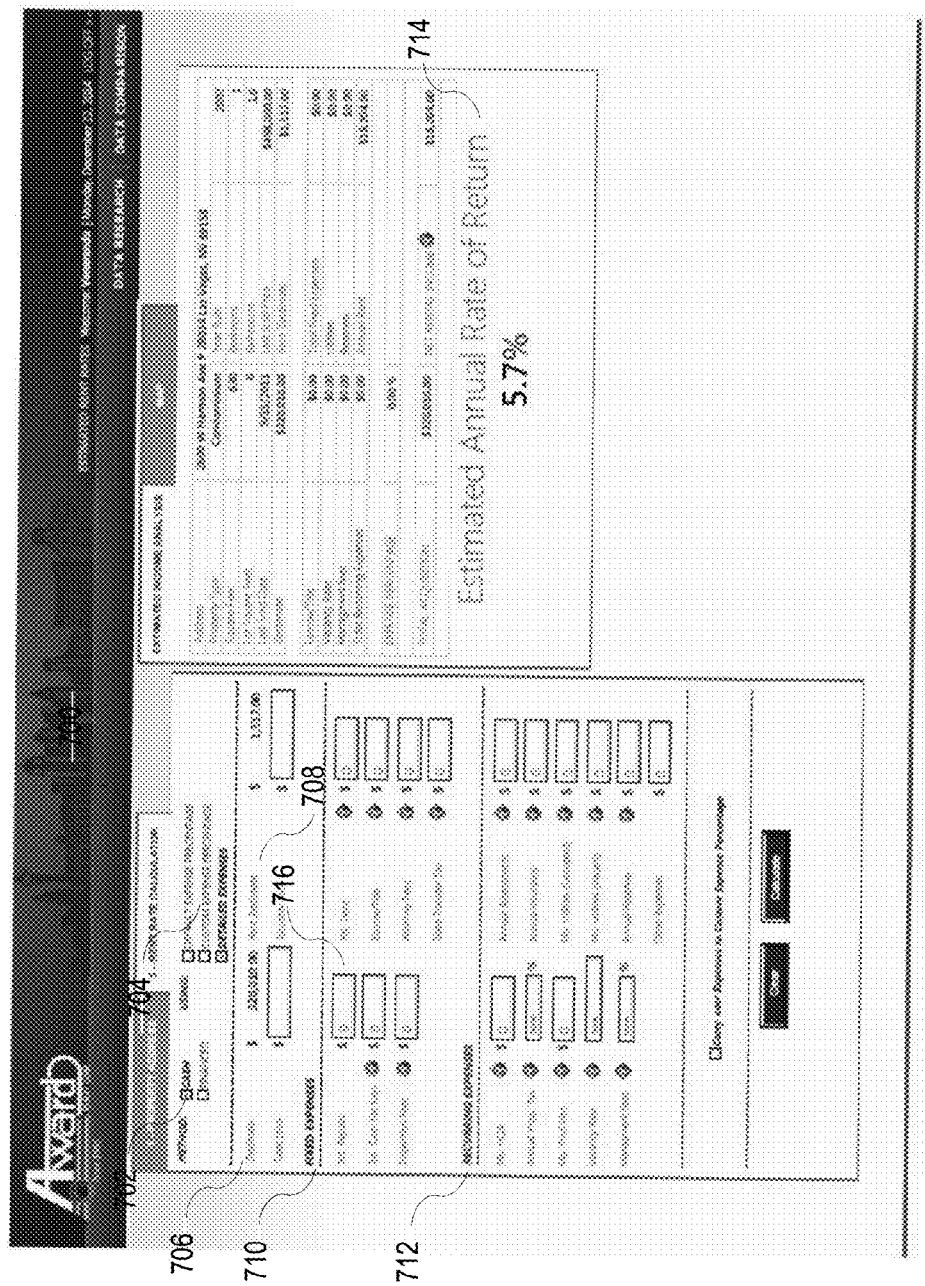
FIG. 7A illustrates a GUI of an asset analysis and evaluation portal according to an embodiment of the invention.

FIG. 7A illustrates a GUI of an asset analysis and evaluation portal according to various embodiments. With reference to FIGS. 6 and 7A, the GUI may display a rent rate calculator 700 in response to the entry of the address 602 (e.g., 2600 W. Hamon Avenue #28034, Las Vegas, Nev. 89158) in the search screen 600 described with respect to FIG. 6. In some embodiments, an investor may select the corresponding fields in the rent rate calculator 700 to calculate an ROI 714 for a real estate investment property that is purchased using a cash method 702 and based on detailed expenses 704. In various embodiments, the analysis server 30 may be configured to obtain at least some of the data required for the calculation from the asset data server 40. In some embodiments, the asset data server 40 may be hosted by one or more real estate data collection services including, for example, but not limited to the Multiple Listing Service (MLS), Craigslist, or Zillow®. For example, as shown in FIG. 7A, the purchase price for a property may be a Zestimate® 706 while the rental value may be a rent Zestimate® 708, both of which may be obtained from Zillow®.

As shown in FIG. 7A, the fixed expenses 710 of a real estate investment property may include the estimated repairs, cash for keys, inspection fees, liens, escrow/title, attorney fees, and state transfer tax for the property. Meanwhile, the recurring expenses 712 for the real estate investment property may include the annual HOA, property tax, pool maintenance, vacancy rate, management fees, assessments, insurance, occupied and vacant utilities, and reserves for the property. Individual items in the fixed expenses 710 and the recurring expenses 712 of the real estate investment property may vary depending on the geographic location of the property. A person of ordinary skill in the art can appreciate that a different set of fixed and recurring expenses may be used to calculate the ROI 714 of a real estate investment property without departing from the scope of the present invention. In addition, a person of ordinary skill in the art can appreciate that a same, similar, or different set of fixed and/or recurring expenses may be used to calculate an ROI for other types or categories of assets.

In various embodiments, by selecting to calculate the ROI 714 based on detailed expenses 704, the investor may be able to enter custom or personalized values for one or more of the items included in the fixed expenses 710 and recurring expenses 712 of an asset. Alternately, the investor may select standard values provided by the analysis server 30 for any one of the items included in the fixed expenses 710 and recurring expenses 712 of the asset. The investor may also use one or more estimated values from data received by the analysis server 30 from the asset data server 40. In some embodiments, the investor may provide override values to replace any of the standard values provided by the analysis server 30 and the estimated values that the analysis server 30 receives from the asset data server 40. In various embodiments, the standard values provided by the analysis server 30 are generated based at least in part on values one or more investors have provided to the analysis server 30 over time. Furthermore, the standard values provided by the analysis server 30 may vary depending on the geographic location of the asset, and/or the size or scale of the specified geographic location.

The analysis server 30 may analyze inputs from various investors in order to determine and to refine standard values for each of at least some of the items included in the fixed expenses 710 and recurring expenses 712 for an asset. In various embodiments, the standard values for the items may be geographically specific. For example, the analysis server 30 may segment, group, or tag data received from different investors based on the geographic locations of the corresponding assets. Furthermore, the precision or granularity of the standard values may vary according to the size or scale of the specified geographic region. For example, one investor may be knowledgeable with regards to repair costs. That investor may be able to input custom or personal values for the estimated repairs 716 of a real estate investment property in a particular geographic location. Alternately, that investor may input override values in place of the standard values for the estimated repairs 716 provided by the analysis server 30. Meanwhile, the analysis server 30 may process and/or store the values input by knowledgeable investors such that these values may be used to refine the standard values offered to a less knowledgeable investor. For example, the values input by the knowledgeable investor may be used to compute the standard value for the estimated repairs 716 of other real estate investment properties located in the same specific neighborhood, city, county, and/or state.

Another investor having little to no insight with respect to repair costs may use the standard value for the estimated repairs 716 provided by the analysis server 30. In various embodiments, the analysis server 30 may provide standard values based on different characteristics and/or criteria associated with the asset, such as geographic location. For example, the analysis server 30 may provide one standard value for the estimated repairs 716 for real estate investment properties located in Las Vegas, Nev. and different standard value for the estimated repairs 716 for properties located in Reno, Nev. In addition, the analysis server 30 may provide a more precise or granular standard value for the estimated repairs 716 for real estate investment properties specified to be in Las Vegas, Nev. than for real estate investment properties that are specified to be in Nevada.

Figure 7B:
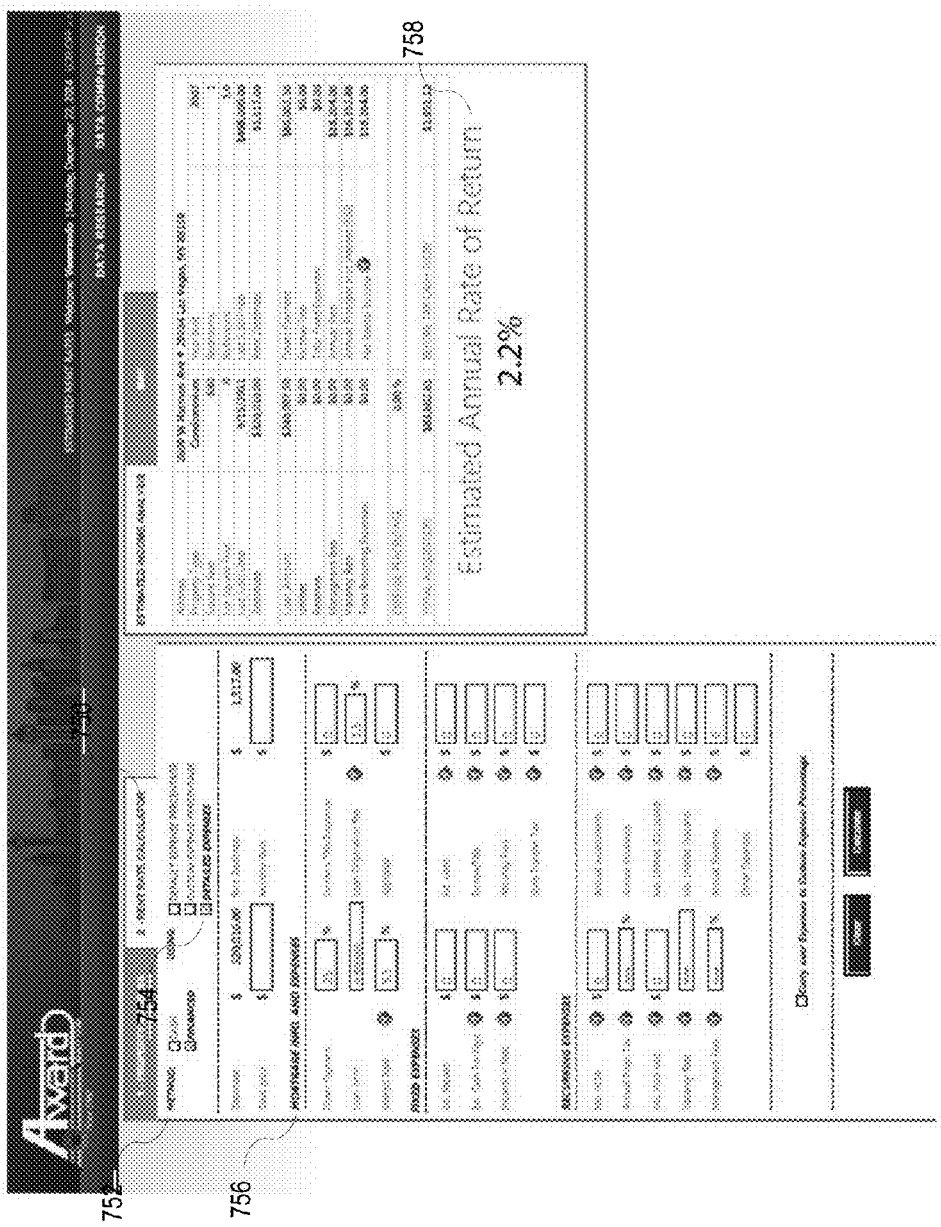
FIG. 7B illustrates a GUI of an asset analysis and evaluation portal according to an embodiment of the invention.

FIG. 7B illustrates a GUI of an asset analysis and evaluation portal according to various embodiments. With reference to FIGS. 6 and 7B, the GUI may display a rent rate calculator 750 in response to the entry of the address 602 (e.g., 2600 W. Harmon Avenue #28034, Las Vegas, Nev. 89158) in the search screen 600 described with respect to FIG. 6. As shown in FIG. 7B, an investor may select the fields in the rent rate calculator 750 corresponding to the options to compute the ROI 758 for an asset that is purchased using a financed method 752 and based on detailed expenses 754.

In various embodiments, the calculation of the ROI 758 may account for the mortgage information and expenses 756 of an asset. As shown in FIG. 7B, the mortgage information and expenses 756 for a real estate investment property may include a down payment percentage, loan terms, interest rate, lender's title insurance, loan origination fee, and appraisal fee. In various embodiments, an investor may enter custom or personal values for any of the items included in the mortgage information and expenses 756 of a real estate investment property. Alternately or in addition, the analysis server 30 may provide standard values for at least some of the items included in the mortgage information and expenses 756 for the real estate investment property. The investor may also use one or more estimated values from data received by the analysis server 30 from the asset data server 40. In some embodiments, the investor may provide override values to replace any of the standard values for the mortgage information and expenses 756 provided by the analysis server 30 as well as any of the estimated values that the analysis server 30 receives from the asset data server 40. A person of ordinary skill in the art can appreciate that mortgage information and expenses may include a different set of items without departing from the scope of the present invention. Furthermore, the mortgage information and expenses for different types or categories of assets may include the same, similar, or different set of items as the mortgage information and expenses 756.

Figure 7C:
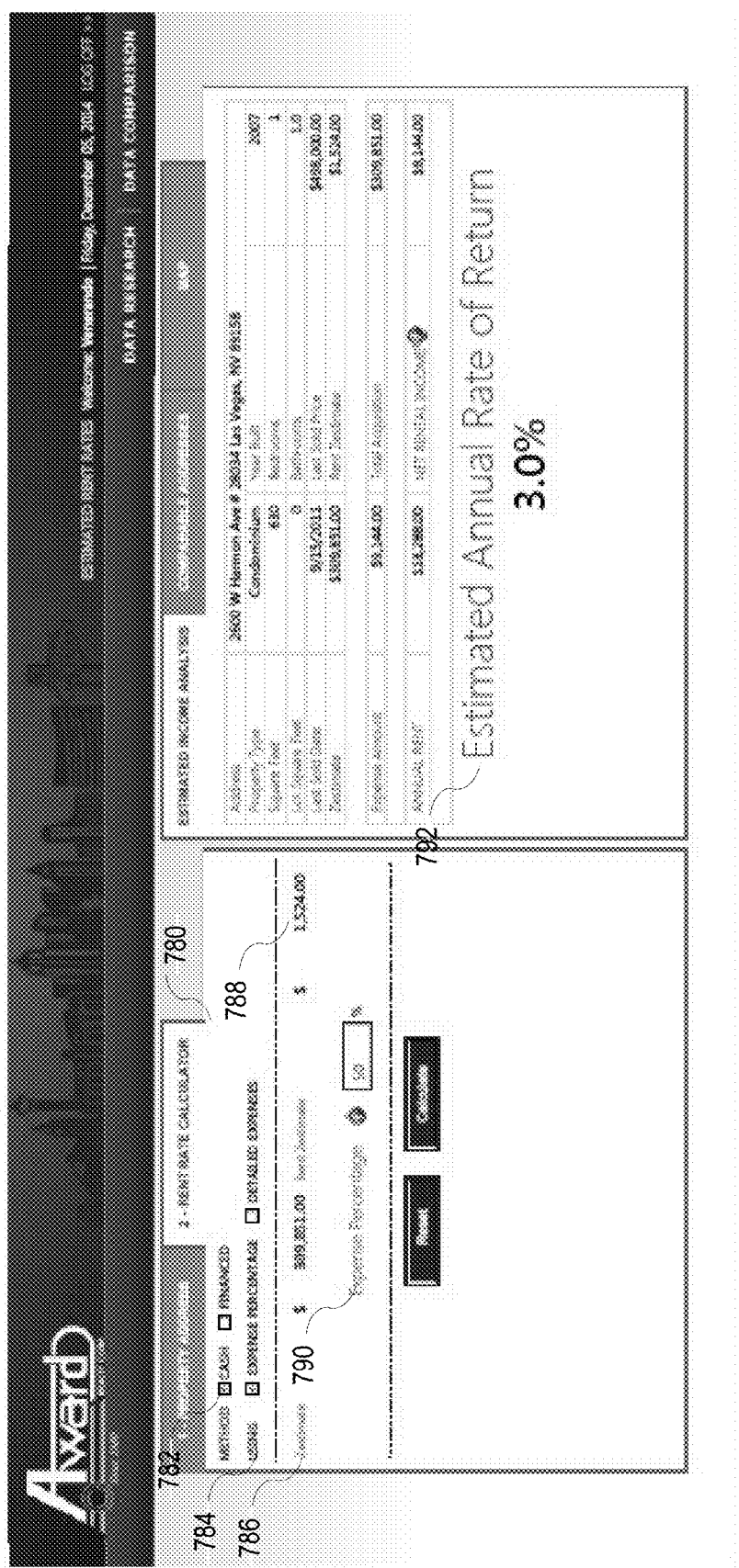
FIG. 7C illustrates a GUI of an asset analysis and evaluation portal according to an embodiment of the invention.

FIG. 7C illustrates a GUI of an asset analysis and evaluation portal according to various embodiments. With reference to FIGS. 6 and 7C, the GUI may display a rent rate calculator 780 in response to the entry of the property address 602 (e.g., 2600 W. Hamon Avenue #28034, Las Vegas, Nev. 89158) in the search screen 600 described with respect to FIG. 6. As shown in FIG. 7C, an investor may select the fields in the rent rate calculator 780 corresponding to the options to compute the ROI 792 for an asset that is purchased using a cash (or financed) method 782 and based on an expense percentage 786.

In various embodiments, the analysis server 30 may compute the ROI 792 based on a purchase price (e.g., a Zestimate 786), a rental value (e.g., a rent Zestimate 788), and an expense percentage 790. The analysis server 30 may obtain the purchase price and rental value for the property from the asset data server 40. For example, in some embodiments, the asset data server 40 may be hosted by one or more real estate data collection services including, for example, but not limited to the Multiple Listing Service (MLS), Craigslist, or Zillow®.

In various embodiments, the analysis server 30 may further provide a standard value for the expense percentage 790. For example, the analysis server 30 may determine a standard value for the expense percentage 790 based on past inputs from investors and/or data from the asset data server 40. In various embodiments, the analysis server 30 may provide different standard values for the expense percentage 790 depending on the geographic location of the asset. Alternately, in some embodiments, an investor may provide a custom or personal value for the expense percentage 790. In those embodiments, the investor's custom or personal value may be an override value that replaces the standard value for the expense percentage 790 provided by the asset analysis server 30.

Figure 8:
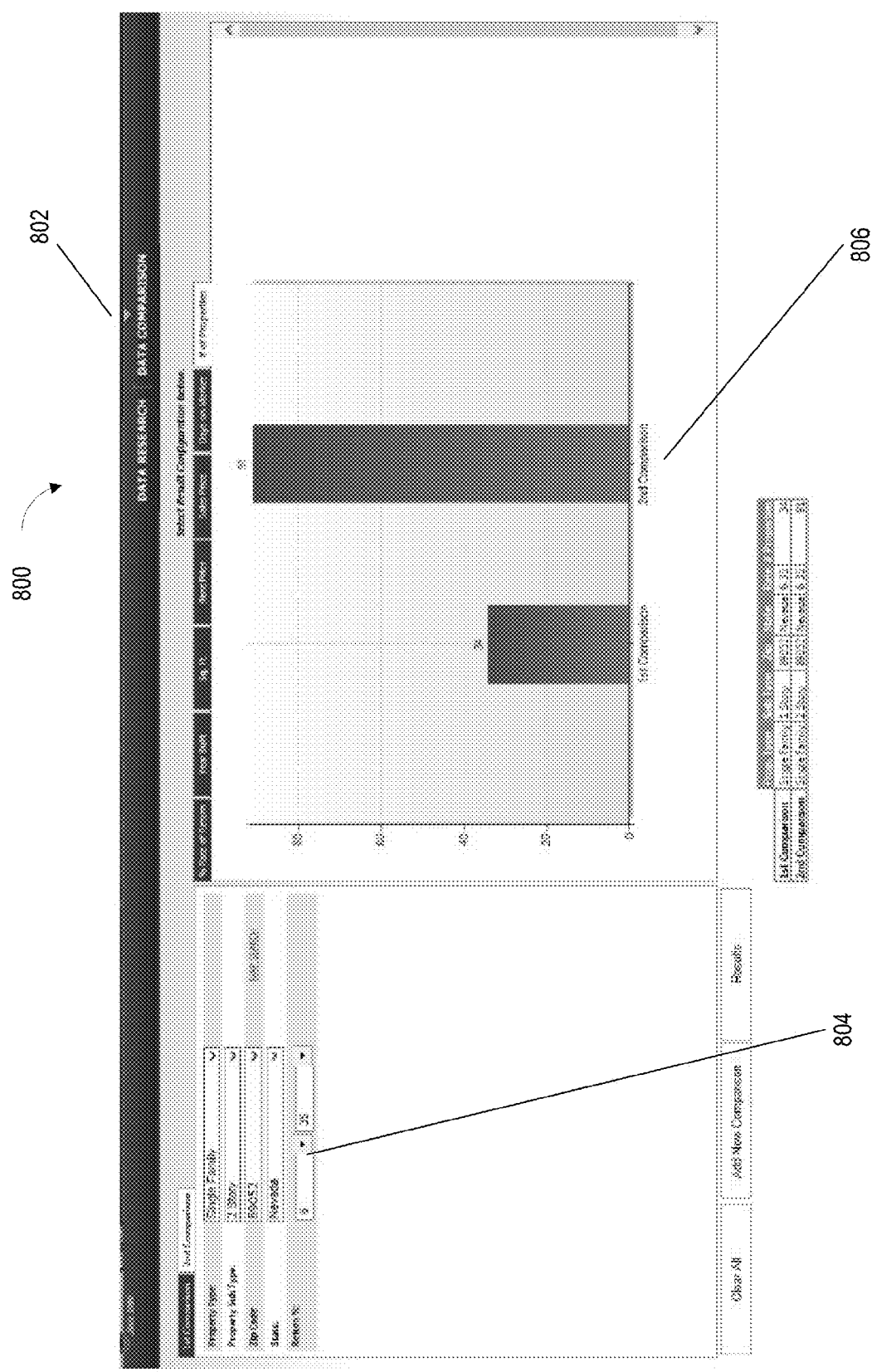
FIG. 8 illustrates a GUI of an asset analysis and evaluation portal according to an embodiment of the invention.

FIG. 8 illustrates a GUI of an asset analysis and evaluation portal according to various embodiments. As shown in FIG. 8, the GUI may display a data comparison screen 800. In various embodiments, an investor may select a data comparison tab 802, which causes the analysis server 30 to compare multiple assets and provide the outcome in the data comparison screen 800. One or more comparison criteria 804 may be selected, after which a comparison chart 806 may be displayed to allow the investor to compare the various characteristics of multiple assets.

For example, the investor may perform a search for single-story homes in zip code 89052 that have an estimated ROI of at least six percent. The investor can then compare these results with the results of a second search for two-story homes in 89052 with an estimated ROI of six percent. The data comparison screen 800 may represent or the outcome using any appropriate, desired, or required info-graphics. For example, the data comparison screen 800 may include a comparison chart 506 showing a bar graph with the number of real estate investment properties yielded from each search.

Example Embodiments

In one exemplary embodiment, the analysis server 30 may optimize the search process for a real estate investment property by evaluating geographically grouped data sets. The analysis server 30 may compute an estimated ROI for one or more real estate investment properties using geographically specific data for one or more individual accounting items, or an overall expense percentage that may vary depending on the geographic location of the property. Alternately or in addition, the analysis server 30 may be configured to use a minimal set of data to generate an initial ROI. Since calculating an initial ROI requires comparatively less or minimal computation resources (e.g., data, time), the analysis server may be able to process a large number of potential real estate investment properties. Instead of expending extensive computational resources to determine an estimated ROI for each property, the initial ROIs may be used to quickly filter and reduce the number of potential real estate investment properties.

For example, an initial ROI for a rental property may be obtained using only an estimated sales price and an estimated rental value in combination with a standard expense percentage that is derived from aggregate data in the first database 35. This aggregate data may include precise and detailed information that were previously obtained (e.g., inputs from investors) for other real estate investment properties that are similar or comparable, and are located in the same geographic region. For example, the analysis server 30 may obtain and aggregate data on, for example, but not limited to, vacancy rates, repairs, liens, HOA fees, reserves/replacements, management fees, taxes, insurance, pool maintenance, utilities, and acquisition costs.

In one embodiment, the initial ROI for a rental property may be calculated by converting an estimated monthly rental value into an annual rental value and subtracting the standard expense factor (i.e., expense percentage) to determine an annual net rental value. The annual net rental value may be divided by the standard expense factor to determine the initial ROI.

In another embodiment, the analysis server 30 permits an investor to provide his or her own customized or personal value (i.e., override value) for the expense percentage. The investor may wish to calculate the ROI for a real estate investment property based on detailed expenses and provide customize or personal values for at least some of the accounting items (e.g., fixed expenses, recurring expenses) associated with the property. For example, the investor may provide values for one or more income an expense items (e.g., property taxes, HOA fees, repairs, pool maintenance) based on personal knowledge. In some embodiments, the investor may use custom or personal values in order to derive an expense percentage that is more reflective of the investor's actual circumstances. In such an embodiment, the initial ROI may be calculated in substantially the same manner but using an expense percentage tailored to the investor's custom or personal data. In some embodiments, the customized or personal values may be override values to replace any of the standard values provided by the analysis server 30 and the estimated values that the analysis server 30 receives from the asset data server 40 with respect to the expense percentage or any of the accounting items that contribute to the expense percentage.

Additionally, on a property-by-property basis, the investor may provide an estimated sale price for the specific property and an estimated monthly rent amount for the specific property. For example, the estimated sale price for a rental property according to a third party resource (e.g., Zillow®) may be higher (or lower) than the price actually anticipated by the investor. Thus, the investor may provide an override value in place of the estimated sale price provided by the third party source. The investor may also provide override values for any of the accounting items for a property rather than rely on standard values provided by the analysis server 30. For example, if an investor expects to manage his or her own investment properties, then the investor may provide an override value for the management cost to determine the ROI of one or more potential investment properties. In various embodiments, the analysis server 30 may receive and store at least some of the override values provided by an investor. The override values may be segmented, grouped, or tagged based on the geographic location of the real estate investment property, and may be used in future computations involving similar or comparable properties in the same geographic region.

In various embodiments, the expense items contributing to the expense percentage may include recurring expense items. Recurring expense items may include, for example, but not limited to:

1. Annual Home Owner Association ("HOA") Expenses
2. Property Tax
3. Pool Maintenance
4. Vacancy Rate
5. Management Fees
6. Assessments 7. Insurance
8. Occupied and Vacant Utilities
9. Reserves In various embodiments, the analysis server 30 may analyze data on a specific property to determine whether the property had certain characteristics (e.g., a swimming pool) that would require the inclusion of additional expense items.

In an alternative embodiment, the analysis server 30 provides an investor the option to customize the annualized purchase cost for an investment property purchased through financing. The analysis server 30 may provide standard or predetermined values for one or more mortgage expense items such as down payment, interest rate, and term. Alternately or in addition, the analysis server 30 may receive override values for any of the standard or predetermined values for the mortgage expense items.

The table below illustrates an example in which data from a variety of sources may be used to determine the ROI for a real estate investment property. For example, in the table below, the sales price and the monthly rent for the property are provided by the asset data server 40 (e.g., Zillow®). Meanwhile, the remaining accounting items for the property may be a combination of standard values calculated by the analysis server 30 based on historical data (e.g., previously received data from the asset data server 40 and/or user inputs), and customized or personal values (e.g., override values) provided by an investor.

| VARIABLE | VALUE | SOURCE |
| --- | --- | --- |
| Sales price | $150,000 | Zillow |
| Monthly rent price | $1,100 | Zillow |
| Down payment (=30%) | $45,000 | Average % calculated by analysis server |
| Interest rate | 5.25% | Average % calculated by analysis server |
| Loan term | 30 YEAR FIXED | Average value or custom value from user |
| Loan origination fee (=1.5%) | $1,575 | Average $ value or custom $ value from user |
| Escrow fee | $690 | Average $ value or custom $ value from user |
| Appraisal fee | $400 | Average $ value or custom $ value from user |
| Lender's title insurance | $408 | Average $ value or custom $ value from user |
| Annual Principal & Interest (P&I) | $6,957.72 | Average % or $ value or custom % or $ value from user |
| Gross Annual rent | $13,200 | Calculated using average estimated vacancy reduction $ value or custom estimated vacancy reduction $ value from user |
| Adjusted Annual Income for estimated offset expenses (Net Operating Income) | $7,920 | Calculated |
| Before Tax Cash Flow | $962.28 | Calculated |
| Cash on Cash Return | 2.0% | Calculated |

For clarity and convenience, the systems and methods disclosed herein was described with respect to real estate investment properties. However, a person of ordinary skill in the art can appreciate that the evaluation of geographically grouped data sets may be applied to the analysis of other types of categories of assets for investment, including, for example, but not limited to, local and regional businesses, sporting facilities and professional athletes, travel or short term accommodations (e.g., hotels), and land development sites.

Network Implemented Embodiment

Referring back to FIG. 1, in one embodiment implemented via a global computer network (e.g., the Internet), an investor operates the investor device 20 and is communicatively coupled with the analysis server 30 via the network 50. The investor device 20 may also be communicatively coupled with the asset data server 40 via the network 50. The analysis server 30 is communicatively coupled with the asset data server 40 via the network 50.

In some embodiments, the asset data server 40 may be affiliated with, operated, and/or maintained by a third party service (e.g., Zillow®). The analysis server 30 includes programmed modules in its data storage area 35 and these modules alone or in combination implement one or more application programming interfaces to the asset data server 40 that are designed to obtain information about individual assets.

In operation, the investor operates the investor device 20 to access the analysis server 30, which provides a user interface to the investor device 20. The user interface allows the investor to search for and identify specific assets that the investor is interested in learning more about. Upon receiving a selection of one or more specific assets from the investor device 20, the analysis server 30 uses the one or more application programming interface modules to obtain information from the asset data server 40 about each of the one or more assets. This information is then presented on the display of the investor device 20 with appropriate designations regarding the source of the data.

Additionally, the analysis server 30 may use partial and/or more generalized information about a specific asset to calculate an initial ROI for the asset. Advantageously, even though the initial ROI may be less precise than the more robust estimated ROI typically provided by the analysis server 30, the initial ROI may be used to filter a large number of assets so that the more time consuming and accurate estimated ROI may be subsequently computed for those assets that are the most promising or the most desirable. Calculating the initial ROI may significantly reduce the expenditure of computational resources (e.g., time, data).

In this embodiment, although the specific information about an asset may be unknown, the analysis server 30 may substitute standard values for one or more accounting items, or the expense percentage used to determine an initial and/or an estimated ROI for the asset.

Figure 9:
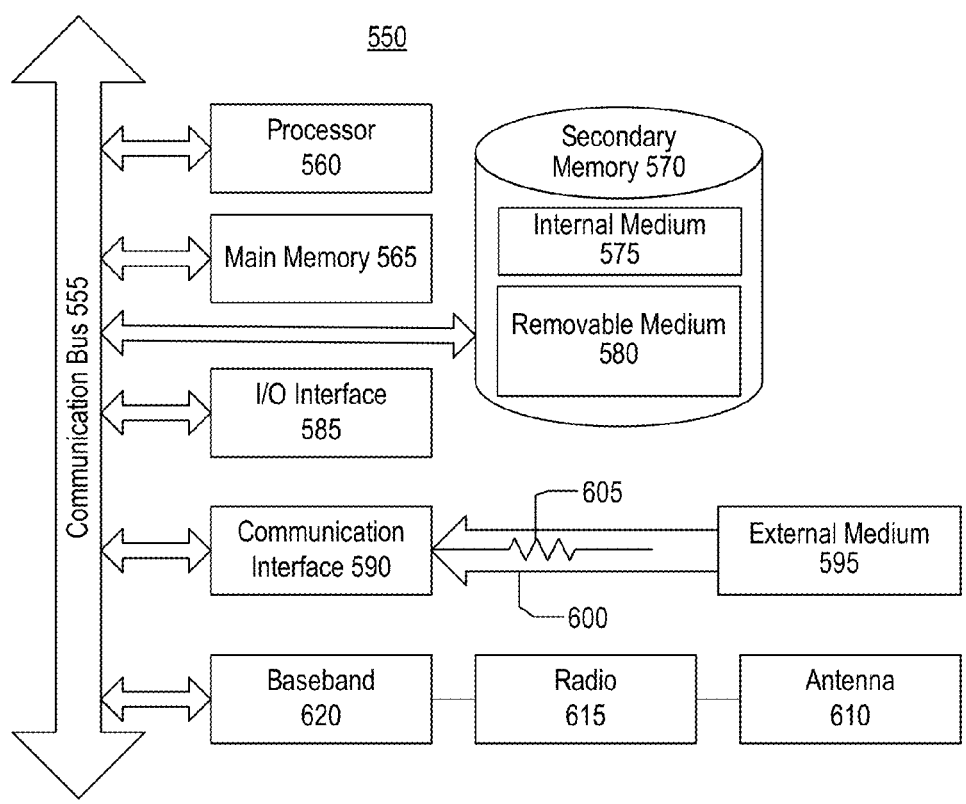
FIG. 9 is a block diagram illustrating a device according to various embodiments.

FIG. 9 is a block diagram illustrating a device 550 according to various embodiments. The device 550 may be a wired or a wireless processor-enabled device. In various embodiments, the device 550 may be used to implement or in conjunction with the investor device 20 described with respect to FIGS. 1 and 2. The device 550 may be, for example, but not limited to, a personal computer, computer server, personal digital assistant, smart phone, tablet computer, or any other processor enabled device that is capable of wired or wireless data communication. Other computer systems and/or architectures may be also used, as will be clear to those skilled in the art.

The device 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the device 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Device 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the device 550 for execution by the processor 560.

In alternative embodiments, secondary memory 570 may include other similar means for allowing computer programs or other data or instructions to be loaded into the device 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the device 550.

Device 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

Device 550 may also include a communication interface 590. The communication interface 590 allows software and data to be transferred between device 550 and external devices (e.g. printers), networks, or information sources. For example, computer software or executable code may be transferred to device 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the device 550 to perform the various functions of the present invention as previously described.

In this description, the term "computer readable medium" is used to refer to any non-transitory computer readable storage media used to provide computer executable code (e.g., software and computer programs) to the device 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the device 550.

In an embodiment that is implemented using software, the software may be stored on a computer readable medium and loaded into the device 550 by way of removable medium 580, I/O interface 585, or communication interface 590. In such an embodiment, the software is loaded into the device 550 in the form of electrical communication signals 605. The software, when executed by the processor 560, preferably causes the processor 560 to perform the inventive features and functions previously described herein.

The device 550 also includes optional wireless communication components that facilitate wireless communication over a voice and over a data network. The wireless communication components comprise an antenna system 610, a radio system 615 and a baseband system 620. In the device 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the device 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A system, comprising:
an analysis server comprising:
a non-transitory computer readable medium for storing computer executable instructions; and
a processor communicatively coupled with the non-transitory computer readable medium and configured to execute the instructions stored therein to perform operations comprising:
presenting on a display of a first user device, a graphic user interface (GUI) comprising an interactive map and configured to receive a first inquiry;
receiving, from the first user device via the GUI, the first inquiry corresponding to a first asset located in a first geographic region;
generating a query corresponding to the first asset based at least in part on the first inquiry;
transmitting the query to at least one asset data server;
receiving, from the at least one asset data server, data associated with the first asset in response to the query;
determining an expense percentage based on at least a portion of data received from the at least one asset data server in response to the query;
receiving, from one of the first user device and a second user device, a second inquiry including a minimum return on investment (ROI);
determining, in response to the second inquiry, an initial ROI for each of a second asset and a third asset in the first geographic region based at least in part on the expense percentage;
determining that the initial ROI for the second asset exceeds the minimum ROI specified by the second inquiry and that the initial ROI for the third asset does not exceed the minimum ROI specified by the second inquiry;
determining an estimated ROI for the second asset but not the third asset in response to a determination that the initial ROI for the second asset exceeds the minimum ROI and that the initial ROI for the third asset does not exceed the minimum ROI; and
in response to determining that the estimated ROI for the second asset exceeds the minimum ROI, presenting on the display of the first user device an updated interactive map indicating a location of at least the second asset; and
at least one asset data server communicatively coupled with the analysis server via a communication network and comprising:
a non-transitory computer readable medium for storing computer executable instructions; and
a processor communicatively coupled with the non-transitory computer readable medium and configured to execute the instructions stored therein to perform operations comprising:
receiving, from the analysis server, the query corresponding to the first asset; and
transmitting, to the analysis server, data including at least one of an estimated sale value of the first asset and an estimated rental value of the first asset to the analysis server in response to the query.

2. The system as recited in claim 1, wherein the first inquiry includes one or more user inputs associated with the first asset.

3. The system as recited in claim 2, wherein the one or more user inputs include values for at least one of the following expense items associated with the first asset: a mortgage, repairs, vacant utilities, occupied utilities, cash for keys, liens, escrow and lender's title insurance, management fees, homeowners association (HOA) fees, taxes, insurance, pool maintenance, and reserve.

4. The system as recited in claim 2, wherein the expense percentage is further determined based on the one or more user inputs.

5. The system as recited in claim 1, wherein the processor is further configured to execute instructions to perform operations comprising:
storing, in the computer readable medium, at least one of the following: data received from the at least one asset data servers in response to one or more queries corresponding to a plurality of assets, and data calculated based at least in part on the data received from the at least one asset data servers in response to the one or more queries corresponding to the plurality of assets.

6. The system as recited in claim 5, wherein the processor is further configured to execute instructions to perform operations comprising:
determining a standard value for at least one expense item associated with the second asset based on at least a portion of data associated with the plurality of assets and stored in the computer readable medium.

7. The system as recited in claim 5, wherein the processor is further configured to execute instructions to perform operations comprising:
determining a standard value for the at least one expense item associated with the second asset based on data associated with one or more other assets located in the first geographic region and having one or more of a same characteristic as the second asset.

8. The system as recited in claim 7, wherein the estimated ROI is determined based at least in part on a standard value for at least one expense item associated with the second asset.

9. The system as recited in claim 1, wherein the second inquiry further includes a user specified value for at least one expense item associated with the second asset.

10. The system of claim 9, wherein the estimated ROI is determined based at least in part on the user specified value for the at least one expense item associated with the second asset.

11. A system, comprising:
an analysis server comprising:
a non-transitory computer readable medium for storing computer executable instructions; and
a processor communicatively coupled with the non-transitory computer readable medium and configured to execute the instructions stored therein to perform operations comprising:
presenting, on a display of a first user device, a graphic user interface (GUI) comprising an interactive map and configured to receive a first inquiry;

receiving, from the first user device via the GUI, the first inquiry corresponding to a first asset located in a first geographic region;

generating a query corresponding to the first asset based at least in part on the first inquiry;

transmitting the query to at least one asset data server;

receiving, from the at least one asset data server, data associated with the first asset in response to the query;

determining a first standard value for a first expense item and a second standard value for a second expense item based on at least a portion of data received from the at least one asset data server in response to the query;

receiving, from the first user device, an override value for the second expense item;

determining a return on investment (ROI) for the first asset based at least in part on the first standard value for the first expense item and the override value for the second expense item instead of the second standard value; and presenting, on the display of the first user device, an updated interactive map indicating a location of at least the first asset; and at least one asset data server communicatively coupled with the analysis server via a communication network and comprising:

a non-transitory computer readable medium for storing computer executable instructions; and a processor communicatively coupled with the non-transitory computer readable medium and configured to execute the instructions stored therein to perform operations comprising:

receiving, from the analysis server, the query corresponding to the first asset; and transmitting, to the analysis server, data including at least one of an estimated sale value of the first asset and an estimated rental value of the first asset to the analysis server in response to the query.

12. The system as recited in claim 11, wherein at least one of the first expense item and the second expense item comprises one of the following: a mortgage, repairs, vacant utilities, occupied utilities, cash for keys, liens, escrow and lender's title insurance, management fees, homeowners association (HOA) fees, taxes, insurance, pool maintenance, and reserve.

13. The system as recited in claim 11, wherein the processor is further configured to execute instructions to perform operations comprising:

generating a second query corresponding to a second asset based at least in part on the second inquiry;

transmitting the second query to the at least one asset data server; and receiving, from the at least one asset data server, data associated with the second asset in response to the second query.

14. The system as recited in claim 13, wherein the data received from the at least one asset data server in response to the second query includes at least one of an estimated sale value of the second asset and an estimated rental value of the second asset.

15. The system as recited in claim 14, wherein the ROI for the second asset is further determined based on the data received from the at least one asset data server in response to the second query.

16. The system as recited in claim 13, wherein the processor is further configured to execute instructions to perform operations comprising:

storing, in the computer readable medium, at least one of the following: data received from the at least one asset data servers in response to one or more queries corresponding to a plurality of assets, and data calculated based at least in part on the data received from the at least one asset data servers in response to the one or more queries corresponding to the plurality of assets.

17. The system as recited in claim 16, wherein at least one of the first standard value for the first expense item and the second standard value for the second expense item is further determined based on at least a portion of data associated with the plurality of assets and stored in the computer readable medium.

18. A system, comprising:

an analysis server comprising:

a non-transitory computer readable medium for storing computer executable instructions; and a processor communicatively coupled with the non-transitory computer readable medium and configured to execute the instructions stored therein to perform operations comprising:

presenting, on a display of a first user interface, a graphic user interface (GUI) comprising an interactive map and configured to receive a first inquiry;

receiving, from the first user device via the GUI, the first inquiry corresponding to a first asset located in a first geographic region;

generating a query corresponding to the first asset based at least in part on the first inquiry;

transmitting the query to at least one asset data server;

receiving, from the at least one asset data server, data associated with the first asset in response to the query;

determining an expense percentage based on at least a portion of data received from the at least one asset data server in response to the query;

receiving, from one of the first user device and a second user device, a second inquiry including a minimum return on investment (ROI);

determining, in response to the second inquiry, an initial ROI for each of a second asset and a third asset in the first geographic region based at least in part on the expense percentage;

determining that the initial ROI for the second asset exceeds the minimum ROI specified by the second inquiry and that the initial ROI for the third asset does not exceed the minimum ROI specified by the second inquiry;

determining an estimated ROI for the second asset but not the third asset in response to a determination that the initial ROI for the second asset exceeds the minimum ROI and that the initial ROI for the third asset does not exceed the minimum ROI; and in response to determining that the estimated ROI for the second asset exceeds the minimum ROI, presenting on the display of the first user device an updated interactive map indicating a location of at least the second asset.

19. The system of claim 18, further comprising:

receiving, from the first user device, an override value for an expense item; and wherein determining an expense percentage comprises determining an expense percentage based on at least a portion of data received from the at least one asset data server in response to the query and the override value for the expense item from the first user device.

* * * * *